No. 835,650. PATENTED NOV. 13, 1906.
J. WEILL.
NAILLESS HORSESHOE.
APPLICATION FILED JUNE 15, 1906.

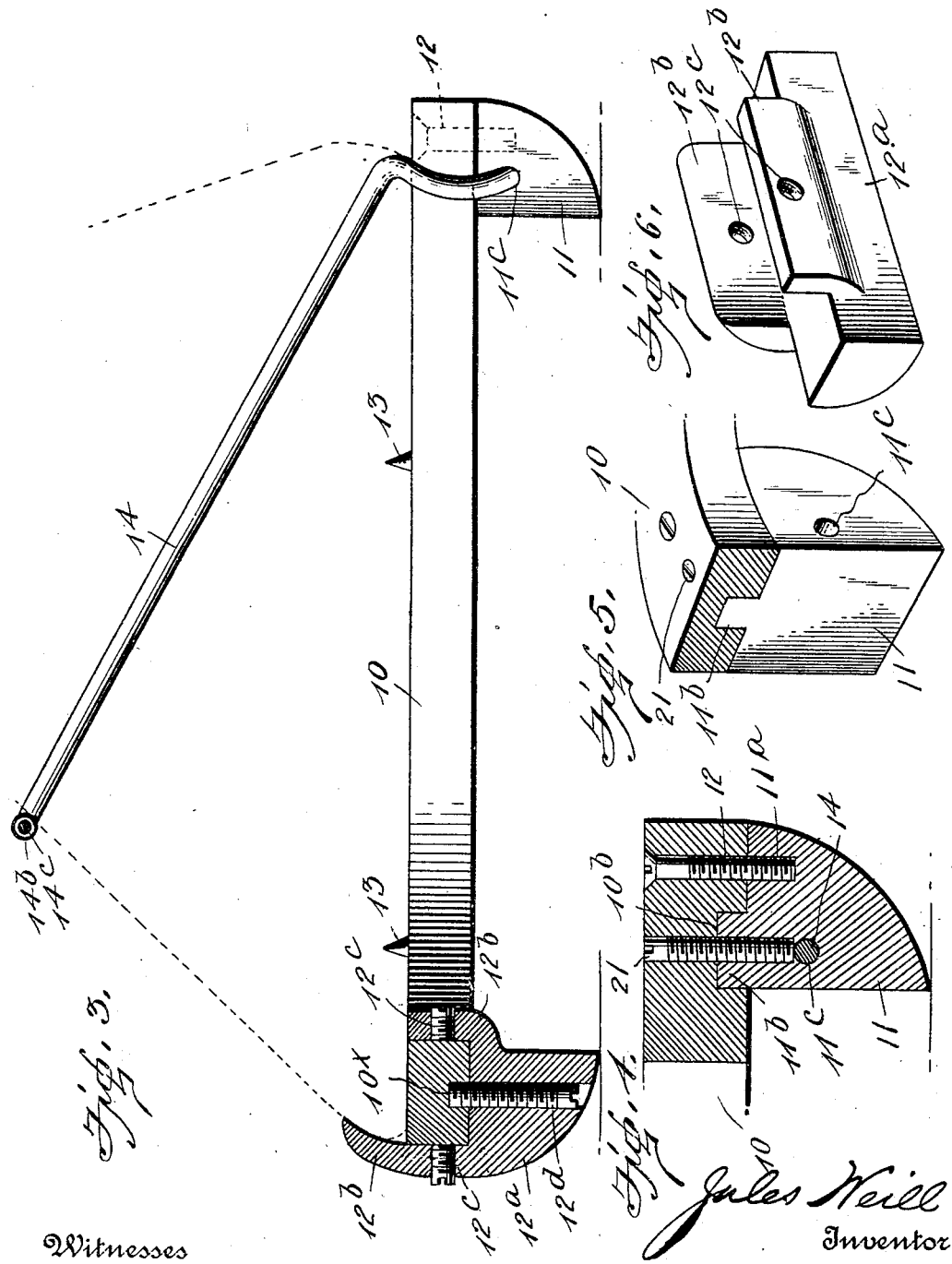

2 SHEETS—SHEET 1.

Witnesses

Jules Weill, Inventor

By Milo B. Stevens & Co., Attorneys

UNITED STATES PATENT OFFICE.

JULES WEILL, OF CHICAGO, ILLINOIS.

NAILLESS HORSESHOE.

No. 835,650.  Specification of Letters Patent.  Patented Nov. 13, 1906.

Application filed June 15, 1906. Serial No. 321,871.

*To all whom it may concern:*

Be it known that I, JULES WEILL, a citizen of the United States, residing at Chicago, in the county of Cook and State of Illinois, have invented new and useful Improvements in Nailless Horseshoes, of which the following is a specification.

This invention relates to improvements in nailless horseshoes, characterized especially by improved means for attaching the shoe and also improved removable heel-calks and toe-pieces.

Figure 1:
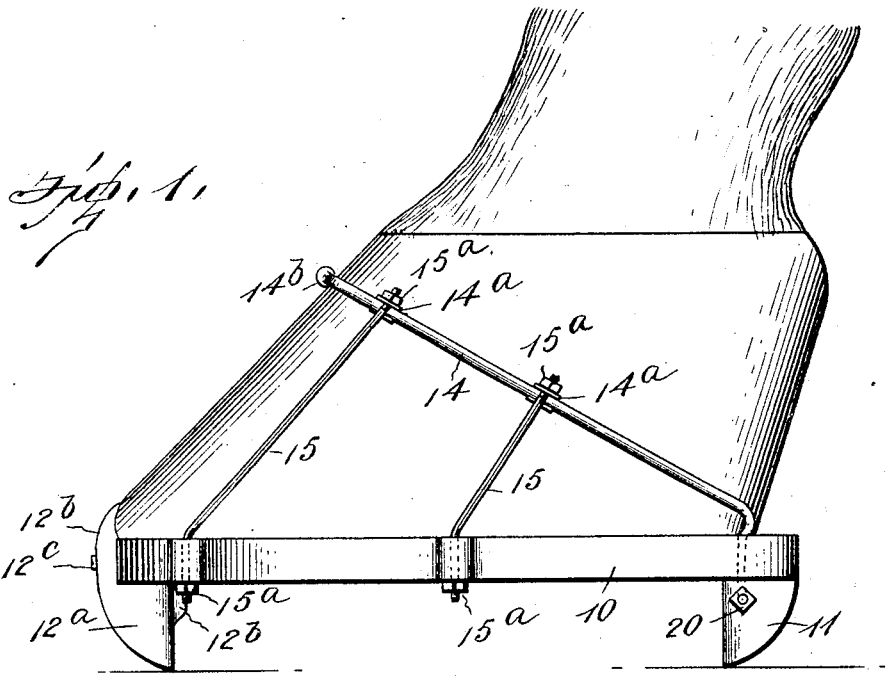
Figure 2:
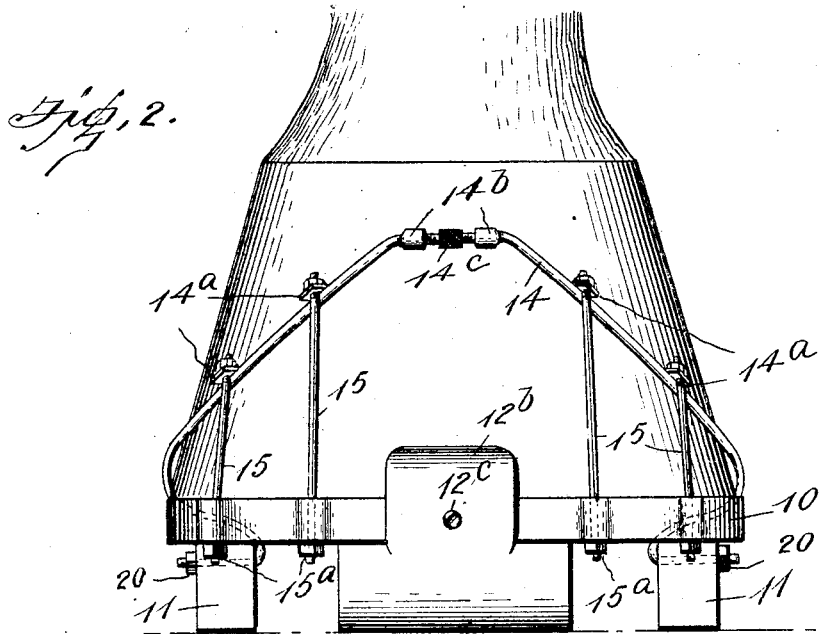

In the drawings, Figure 1 is a side elevation showing the shoe attached to a horse's hoof. Fig. 2 is a front view of the same. Fig. 3 is a longitudinal section of the shoe. Figs. 4 and 5 are details of the removable heel-calks. Fig. 6 is a perspective of the removable toe-calks.

As shown in the drawings, 10 refers to a curved horseshoe plate, base, or bar, of the usual contour or shape, having at the heels removable calks 11. Each of these calks is attached by means of a screw 12, preferably passing through the shoe-bar from its upper side and entering a screw-threaded socket $11^a$ in the calk. A tongue $11^b$ is also provided on the top of the calk, which enters a recess or notch $10^b$ in the heel of the shoe. Thus the calk is prevented from twisting or turning. I also provide in each calk a transverse hole $11^c$.

14 is a sectional rod or band, preferably of cast aluminium, which is intended to encircle the body of the hoof, as shown in the drawings, and is for the purpose of retaining the shoe in place. The ends of this rod are bent in under the heel of the hoof and pass thence outwardly through the holes $11^c$ in the heel-calks and may have the ends upset or preferably threaded and provided with small nuts, 20, Fig. 1, or with binding-screws 21, Fig. 4, to secure the same in place. These rod-sections form an adjustable attachment for securing shoes to hoofs of various sizes. Said sections are connected together at the front of the hoof by a right-and-left screw $14^c$, which screws into threaded sockets $14^b$ in the adjacent ends of the sections. The sections can thereby be drawn together tight across the hoof.

The toe-calk consists of a sharpened or beveled plate $12^a$, having at the top front and rear flanges $12^b$, provided with screw-holes $12^c$, through which set-screws enter and secure the toe-plate to the front of the shoe, the bar of which enters between the flanges. Additional screws $12^d$ may also be employed in holes extending vertically from the under side of the calk and through the same, so as to enter the shoe-bar in a threaded socket at $10^x$ and secure the toe-calk more firmly.

13 represents small pointed studs on the top of the shoe-bar, and these enter the hoof slightly and aid in securing and holding the shoe thereon.

Small curved rods or wires 15, preferably of soft metal, are attached to the sides of the shoe, as shown at $15^a$. These wires form ties from the side of the shoe to the rod 14, which is provided with clips $14^a$, to which the wires 15 are connected, and small nuts $15^a$ or other suitable means may be employed for securing the ties 15 to said clips and the shoe-bar.

It will be seen that by the means I have provided anyone can place my improved horseshoe on a horse's foot. It may be secured in position in a few minutes, and any one with simple tools, such as screw-driver and small wrench, may readily adjust the same and make repairs. When the calks become worn, new ones may be attached, the old shoe-plate being continuously used.

I claim—

A horseshoe having heel-calks and holes extending crosswise through said calks, a band bent around the hoof and under the heel thereof and extending at its ends outwardly through said holes and having fastening devices thereat, and ties connecting said band and the fore part of the shoe.

In testimony whereof I have signed my name to this specification in the presence of two subscribing witnesses.

JULES WEILL.

Witnesses:
NELLIE FELTSKOG,
H. G. BATCHELOR.